(12) United States Patent
Huang et al.

(10) Patent No.: US 8,227,655 B2
(45) Date of Patent: Jul. 24, 2012

(54) METHOD FOR SOLIDIFYING AND STABILIZING WASTE ACID

(75) Inventors: Ching-Tsuen Huang, Taoyuan County (TW); Ching-Tu Chang, Taoyuan County (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 0 days.

(21) Appl. No.: 13/277,280

(22) Filed: Oct. 20, 2011

(65) Prior Publication Data

US 2012/0041249 A1  Feb. 16, 2012

Related U.S. Application Data

(62) Division of application No. 11/976,341, filed on Oct. 24, 2007.

(51) Int. Cl.
*A62D 3/00* (2007.01)
*A62D 3/32* (2007.01)
*A62D 3/36* (2007.01)

(52) U.S. Cl. ........ 588/313; 588/300; 588/314; 588/318; 588/400; 588/406

(58) Field of Classification Search .......... 588/313–321, 588/400, 402, 404, 405–408, 249, 249.5, 588/250–260
See application file for complete search history.

(56) References Cited

U.S. PATENT DOCUMENTS 6,204,214 B1 * 3/2001 Singh et al. ................... 501/155

FOREIGN PATENT DOCUMENTS

JP       09253658 A *   9/1997

* cited by examiner

*Primary Examiner* — Jerry Lorengo
*Assistant Examiner* — Jennifer Smith
(74) *Attorney, Agent, or Firm* — Rosenberg, Klein & Lee

(57) ABSTRACT

The present invention discloses a method for solidifying and stabilizing waste acid including steps of condensing waste acid containing phosphoric acid to reduce the volume; mixing the condensed waste acid with waste acid containing fluoroboric acid to solidify and stabilize the mixed waste acid. The pH of the mixed acid is adjusted by adding barium hydroxide as a neutralizer. The efficiency of solidifying waste acid can be improved by partially granulating and by adding solidifying agent indirectly. The method of the present invention can prevent intensely exothermic reaction caused by adding solidifying agents. Furthermore, the method of the present invention is controlled in a temperature of 30 to 45° C. to improve the polymerization of the mixed waste acid so that the efficiency of solidification thereof can be also improved.

8 Claims, 3 Drawing Sheets

METHOD FOR SOLIDIFYING AND STABILIZING WASTE ACID

RELATED APPLICATIONS

This application is a Divisional patent application of co-pending application Ser. No. 11/976,341, filed on 24 Oct. 2007, now pending. The entire disclosure of the prior application Ser. No. 11/976,341, from which an oath or declaration is supplied, is considered a part of the disclosure of the accompanying Divisional application and is hereby incorporated by reference.

BACKGROUND OF THE INVENTION

1. Field of Invention

This invention relates to a method for treating waste acid, and especially, to a method for solidifying and stabilizing waste acid. The method of the present invention can improve efficiency of the solidifying steps and stability of the solidified waste acid.

2. Related Art

In general, the radioactive-contaminated metal wastes include stainless steel and carbon steel which use in the construction of the nuclear power plant. Since of the well worn piping of the nuclear power plant has to be replaced, a large amount of the radioactive-contaminated stainless steel should be treated. Decontaminants and methods for decontaminating have been improved and are applied, such as mechanical decontaminating by hydraulic giant; electrochemical decontaminating by a mixture of phosphoric acid, sulfuric acid, and nitric acid; and chemical decontaminating by decontaminant containing fluoroboric acid. The radioactive-contaminated metal wastes can reach regulations on final disposal of low-level waste after treated by the above-mentioned methods.

Decontaminant containing phosphoric acid and fluoroboric acid are widely applied in the decontamination of the radioactive metal wastes. For example, the mixture of phosphoric acid and nitric acid is applied for decontaminating of the metal wastes containing copper and aluminum; the mixture of phosphoric acid, sulfuric acid and nitric acid is applied to electrochemical decontaminating suitable for the stainless steel wastes; and the decontaminant containing fluoroboric acid is applied to chemical decontaminating. During the decontaminating process, the metal ions accumulate in the decontaminant gradually. Then, the metal salts precipitated after reached the saturated concentration. The precipitated material in the decontaminant is disadvantageous to the decontaminating process. Moreover, if the decontaminant is contaminated by the nuclides and the radioactivity thereof raises, the decontaminant should be regenerated. Metal ions of the recycled decontaminant containing phosphoric acid and fluoroboric acid can be removed by way of oxalic acid selective precipitation, electrolysis recovery, and cation exchange, so that the decontaminant can be recovered and reused thereafter. After several times of the regenesis, decontaminant has to be eliminated since the radioactivity thereof is high. The used decontaminant becomes waste acid.

At the present day, the treatment of radioactive waste acid still makes progress. In the conventional process, the used decontaminant containing fluoroboric acid is treated by destroying the $BF_4^-$ chelate therein so that $CaF_2$ can be precipitated. $BF_4$, which is stable in the room temperature, can be hydrolyzed to form HF by aluminum salt as the catalyst, and then $CaF_2$ is formed after addition of calcium ion. The aforementioned reactions are the following formulas:

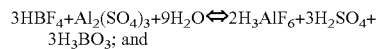

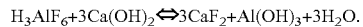

In the formulas, the amount of aluminum salts has to add more than the concentration of fluoroboric acid so that the efficiency of eliminating fluoroboric acid can be ensured. The conventional method for eliminating fluoroboric acid in waste acid is effective but, however, the amount of the secondary waste will increase.

The conventional methods for treating used decontaminant containing phosphoric acid include selectively precipitating and directly neutralizating. In the method of selectively precipitating, for example, in order to treat 2500 L of used decontaminant containing phosphoric acid, 117 kg of iron powder and 1558.5 kg of oxalic acid is necessary to make phosphoric acid precipitate; 7089 L of water is necessary for solid-liquid separation; and the separated water is needed to neutralize and to eliminate oxalic acid by ultraviolet and ozone. After that, the treated decontaminant has to eliminate the radioactivity further. As described in the U.S. Pat. No. 5,645,518 which is titled "Method for stabilizing low-level mixed wastes at room temperature", the phosphate ceramic material is applied to treat the solid and liquid wastes. The solid waste is grinded to a size in a range between 4 and 75 micrometers, contacted the grinded powder with phosphate-containing solution to create phosphates of the oxide in a sol-gel, and solidified the sol-gel. The solidified waste is convenient for follow-up treatment.

As described above, the conventional methods for treating waste acid have disadvantages including: (1) a large amount of the neutralizer is necessary to mix with the same amount of waste acid so that the effect of compaction of waste acid is undesired; (2) the solid sludge and liquid waste generated during treating of waste acid have to treat by another process so that the secondary contamination and the large amount of waste are undesired; (3) heat generated during the treatment of waste acid is hard to control so that the rapid setting caused by heat is disadvantageous to waste acid; and (4) applying neutralizers separately to waste acid is adverse for stabilization of waste acid. The aforementioned disadvantages should be eliminated to improve the solidification and stabilization of waste acid.

In this regard, it is important to provide a method for solidifying and stabilizing waste acid which prevents formation of secondary contamination, has low cost, simplify the processes, and improves the efficiency of solidification to eliminate the foregoing drawbacks.

SUMMARY OF THE INVENTION

Accordingly, it is an object of the present invention to provide a method for treating waste acid to solidify and stabilize by adding barium hydroxide to adjust the pH of waste acid so that waste acid can be stabilized and the corrosion thereof can be reduced.

Another object of the present invention is to provide a method for solidifying waste acid by applying at least one solidifying agent to waste acid so that numerous granules in waste acid are formed. The granule is advantageous to reduce the volume of the solidified waste and to improve the mechanical strength thereof.

Yet another object of the present invention is to provide a method for solidifying waste acid which can prevent the formation of ettringite. The expansion and chap of the solidified waste caused by ettringite can be prevented and the stabilization thereof can be improved.

Still another object of the present invention is to provide a method for solidifying waste acid by adding barium hydroxide to form barium hydrogen phosphate. The formed granule of barium hydrogen phosphate is firm, tiny, solid to coagulate and easy to disperse in waste acid. Waste acid containing granules is easy to flow and to mix with other chemicals.

In order to achieve the above objects, the present invention provides a method for solidifying and stabilizing waste acid including the steps of condensing waste acid containing phosphoric acid; adding barium hydroxide to the condensed waste acid and adjusting the pH thereof to form barium hydrogen phosphate; and adding solidifying agents to solidify barium hydrogen phosphate. In the step of adding barium hydroxide is for adjusting the pH of waste acid and for stabilizing waste acid. The adjusted pH of waste acid can improve the formation of barium hydrogen phosphate. In the step of adding the solidifying agents is adding in batches or continuously so that heat, which generated by the intense reaction and is disadvantageous to solidification, can be prevented. In the method of present invention, waste acid containing phosphoric acid can form granule by adding solidifying agents to reduce the volume of waste acid. Moreover, waste acid containing phosphoric acid can mix with another waste acid containing fluoroboric acid. The pH of the mixed waste acid can be adjusted by adding barium hydroxide so that the stability of the mixed waste acid can be kept. The concentration of the solution and metal ion will not obstruct the solidifying reaction of the mixed waste acid.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

A method for solidifying and stabilizing waste acid of the present invention is to improve the efficiency of the solidifying waste acid, to solve the problem of heat generated by the acid-base reaction, and to keep the efficiency of solidification which may be influenced by concentration of waste acid metal ions contained therein. The conventional method for adjusting pH is adding lime (calcium hydroxide) or sodium hydroxide. Calcium phosphate is formed by adding calcium hydroxide in waste acid containing phosphoric acid. However, during the solidifying reaction of waste acid, low-density ettringite is formed by calcium, which is from calcium phosphate, reacting with tricalcium aluminate in cement. The formed ettringite makes the volume of the solidified product of waste acid expended gradually so that the solidified product becomes chapped. In order to eliminate expansion and chap of the solidified product of waste acid, mass of the solidified product should be increased with undesired volume. Besides, crystal of phosphoric acid is easy formed in waste acid. Crystal is disadvantageous to deliver solidified waste acid in a duct. During the solidifying step of the present invention, granule can be formed so that volume of the solidified waste acid can be reduced and mechanical strength thereof can be improved. The present invention will be apparent from the following detailed description, which proceeds with reference to the accompanying drawings.

Figure 1:
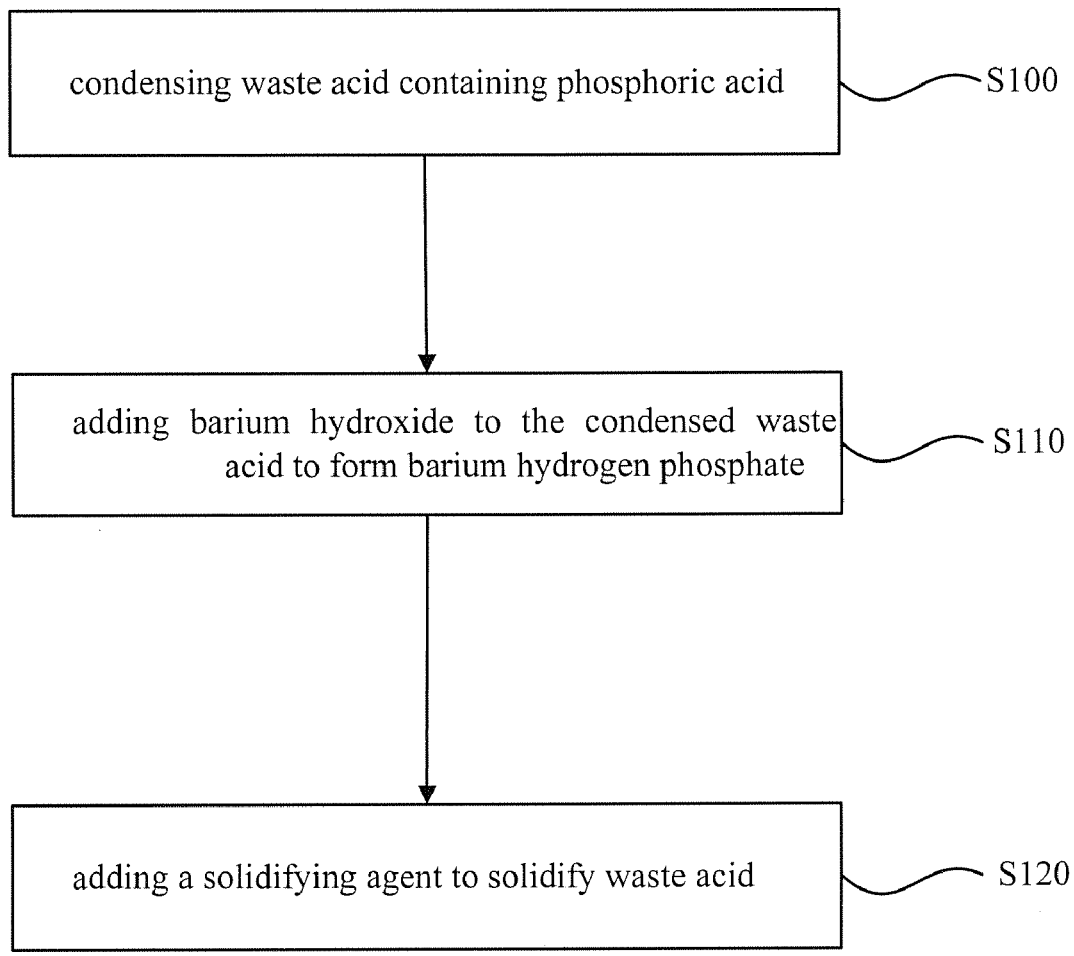
FIG. 1 shows a basic flow diagram of one embodiment of the present invention.

FIG. 1 shows a basic flow diagram of one embodiment of the present invention. In the embodiment, waste acid containing phosphoric acid can be a mixed waste acid, for example a solution of phosphoric acid and nitric acid, or a solution of nitric acid mixing with phosphoric acid or sulfuric acid. As the step 100 shown in FIG. 1, condensing waste acid containing waste acid is proceeded by heating and stirring so that water therein is evaporated. After step 100, waste acid is condensed in a concentration of 50% to 65% which is suitable for further solidification. Next, in the step S110, a conversion of phosphate is proceeded. Barium hydroxide is added to the condensed waste acid. During the addition of barium hydroxide, the condensed waste acid is keeping stirring so that phosphoric acid can react with barium hydroxide to for barium hydrogen phosphate completely. Furthermore, the pH of the mixed waste acid can be adjusted to 2.5-4.5. In the embodiment, the preferred pH is 3. In step 120, when pH of the mixed waste acid is in a range of 2.5 to 4.5, a solidifying agents is added so that the waste acid containing barium hydrogen phosphate can be solidified. The solidifying agent should be added to the mixed waste acid in batches or continuously. Temperature of the mixed waste acid during the addition of the solidifying agent should be kept in a range of 30 to 45° C. In the embodiment, the preferred way for adding solidifying agents is three times in batches. At first time, a half of total weight of the solidifying agent is added. At the second and the third times, a one-fourth of total weight of the solidifying agent is added, respectively.

The following is a detailed description of the embodiment shown in FIG. 1. In the step S100, 3510 g of waste acid containing phosphoric acid, which the initial concentration of phosphoric acid is 45%, is held in a beaker, heating by a heating plate and stirring by an automatic stirrer so that water in waste acid is vaporized and the weight percent of water in waste acid is reduced. After the heating step, 2700 g of the condensed waste acid is obtained and the concentration of phosphoric acid in the condensed waste acid is in a range between 50% and 65%. In the step of S110, the obtained 2700 g of the condensed waste acid is divided into two parts. Two parts of 1350 g of the condensed waste acid are held in two mixers, and 189 g and 181.6 g of barium hydroxide are added to the mixers, respectively. The mixer is kept running for one hour so that phosphoric acid in the condensed waste acid is converted to generate barium hydrogen hydroxide. In this step, barium hydroxide is for adjusting pH of the condensed waste acid and for stabilizing thereof. After addition of barium hydroxide, barium hydrogen hydroxide is generated and pH of the condensed waste acid raises to 3.

As mentioned before, in the result of adding 181.6 g of monohydrous barium hydroxide which is as a neutralizer, the applied amount of the solidifying agent is 310 g, and pH of the solidified product produced from waste acid containing phosphoric acid is 3.8. The compression strength of the solidified product which formed after 12 days and after 28 days are 7.8 and 61.2 kg/cm$^2$, respectively. Besides, in the result of adding 189 g of monohydrous barium hydroxide which is as a neutralizer, the applied amount of solidifying agents is 404.5 g, and pH of the solidified product produced from waste acid containing phosphoric acid is 3.9. The compression strength of the solidified product which formed after 12 days and after 28 days are 101.9 and 112.2 kg/cm$^2$, respectively. As shown in Table 1 below, the method for solidifying and stabilizing waste acid of the present invention can make the compression strength of the solidified product steadily on the increase. The additional amounts of the solidifying agent and the neutralizer make a better characteristic of the solidified product of waste acid.

TABLE 1

Results of solidification of waste acid containing phosphoric acid

| Conditions | | | | Result of solidification | | |
|---|---|---|---|---|---|---|
| Applied amount of the neutralizer (monohydrous barium hydroxide) (g) | Total weight before condensing (g) | Total weight after condensing (g) | Applied amount of the solidifying agent (g) | pH of the solidified product of waste acid | Compression strength after 12 days (kg/cm$^2$) | Compression strength after 28 days (kg/cm$^2$) |
| 181.6 | 1755 | 1350 | 310.0 | 3.8 | 7.8 | 61.2 |
| 189 | 1755 | 1350 | 404.5 | 3.9 | 101.9 | 112.2 |

Assuming that the total weight of waste acid containing phosphoric acid before condensing is 1755 g and total volume thereof is 1013.3 ml. After adding barium hydroxide, and adding the solidifying agent in batches, waste acid is solidified to form a solidified product. The total weight and volume of the solidified product is 1572.5 g and 834 ml, respectively. As shown in Table 2 below, the weight and volume of waste acid can be reduced by the method for solidifying and stabilizing waste acid of the present invention.

TABLE 2

Results of solidification of waste acid containing phosphoric acid

| Conditions | | | Result of solidification | | | | |
|---|---|---|---|---|---|---|---|
| Total weight of waste acid before condensing (g) | Total weight of waste acid after condensing (g) | Volume of waste acid before condensing (ml) | Weight of the solidifying agent (g) | Volume of the solidifying agent (ml) | Specific gravity of the solidifying agent | Weight ratio of IER/ solidifying agent | Volume ratio of IER/ solidifying agent |
| 1755 | 1350 | 1013.3 | 1572.5 | 834 | 1.88 | 1.116 | 1.215 |

Figure 2:
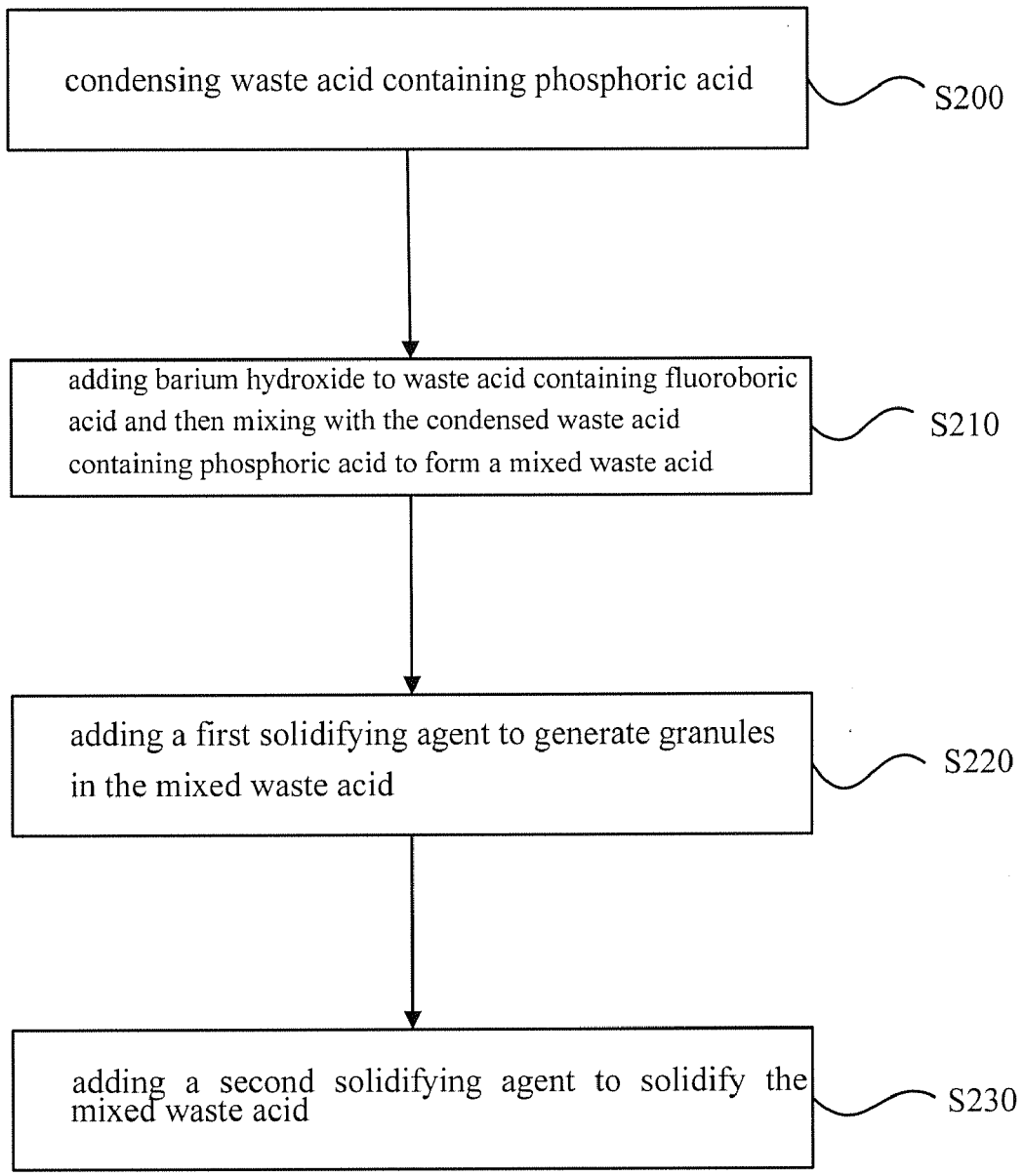
FIG. 2 shows a basic flow diagram of another embodiment of the present invention.

FIG. 2 shows a basic flow diagram of another embodiment of the present invention. The difference between FIG. 1 and FIG. 2 is that in the steps of FIG. 1, barium hydroxide and the solidifying agent are added to solidify waste acid, but in the steps of FIG. 2, barium hydroxide is added to waste acid containing fluoroboric acid and then mixed with waste acid containing phosphoric acid to form a mixed waste acid. A granule is formed by adding a first solidifying agent to the mixed waste acid, and a solidified product of the mixed waste acid is formed by adding a second solidifying agent. In the step of S200 shown in FIG. 2, waste acid containing phosphoric acid is condensed to a concentration of 55%. In the step of S210, barium hydroxide is added to waste acid containing fluoroboric acid to form a precipitation of barium fluoride (BaF$_2$), and then, is mixed with the condensed waste acid containing phosphoric acid in the concentration of 55% to form a stable mixed waste acid. In the mixed waste acid, the weight ratio of waste acid containing phosphoric acid to waste acid containing fluoroboric acid is six. In the step 220, the mixed waste acid is added by dropping to a first solidifying agent so that a plurality of small granule in the mixed waste acid are formed. The first solidifying agent is consisted of cement, slag, and fly ash. In the step of S230, the formed granule is added to another half of the mixed waste acid which is kept stirring. Next, a second solidifying agent is added to another half of the mixed waste acid to solidify. Since the granule in the mixed waste acid is as an aggregate in the solidified product. Weight of the formed solidified product can be reduced. In the embodiment, the second solidifying agent is cement.

The following is a detailed description of the embodiment shown in FIG. 2. In the step of S200, 6282 g of waste acid containing phosphoric acid is condensed to 5140 g with a concentration of 55%. In the step of S210, barium hydroxide is added to waste acid containing fluoroboric acid, and then is mixed with the condensed waste acid containing phosphoric acid to form a mixed waste acid. In the embodiment, weight of waste acid containing fluoroboric acid is 860 g, and applied amount of barium hydroxide is 396 g. In the step of S220, 3029 g of the solidifying agent is mixed with the mixed waste acid to form the granules. After the granulating, weight of liquid in the mixed waste acid reduced to 68.91% in comparison with the mixed waste acid before granulating. In contrast, the steps shown in FIG. 2 are carried out by 6747 g of waste acid containing phosphoric acid with a concentration of 50%, 1122 g of waste acid containing fluoroboric acid, 524 g of barium hydroxide, and 4223 g of the first solidifying agent. After the granulating, weight of liquid in the mixed acid reduced to 77.72% in comparison with the mixed waste acid before granulating. The foregoing results are listed in the Table 3. The weight of liquid in waste acid can be reduced by the method for solidifying and stabilizing waste acid of the invention.

TABLE 3

Results of granulation of waste acid containing phosphoric acid mixed with fluoroboric acid

| | Conditions | | | | | Results of granulation | |
|---|---|---|---|---|---|---|---|
| Concentration of waste acid containing phosphoric acid after condensed (%) | Total weight of waste acid containing phosphoric acid before condensing (g) | Total weight of waste acid containing phosphoric acid after condensed (g) | Total weight of waste acid containing fluoroboric acid (g) | Applied amount of the neutralizer (monohydrous barium hydroxide) (g) | Applied amount of the solidifying agent | Total weight of the granule after granulation | Total weight of the granule after granulation/ mixed waste acid + Applied amount of the neutralizer |
| 55 | 6282 | 5140 | 860 | 396 | 3029 | 7282.2 | 68.91 |
| 50 | 7500 | 6747 | 1122 | 524 | 4223 | 10391 | 77.72 |

In the step of S230, the weight of waste acid containing phosphoric acid before condensing is 1571 g, total weight of waste acid containing fluoroboric acid is 215 g applied amount of barium hydroxide is 210 g, and the weight ratio of the applied amount of the total solidifying agent to the mixed waste acid is 30.1%. After solidifying, the compression strength of the solidified product which formed after 3 days and after 28 days are 25 kg and 28 kg/cm$^2$, respectively. Furthermore, in the water-resistance test of the sample which the compression strength is 74 kg per square centimeter, the result of compression strength after dipping in water for three months is 53.5 kg/cm$^2$. It indicated that the solidified product of waste acid formed by the method of the invention has improved weather resistance and water resistance characteristics. As shown in Table 4, the granule is formed by the first solidifying agent and the efficiency of solidification would not be influenced. In the steps shown in FIG. 2, a half of waste acid is inactivated, and then another half of waste acid is combined therewith to solidify. Heat of acid-base reaction and rapid setting caused by heat can be prevented to influence the quality of the solidified product of waste acid so that the compression strength of the solidified product can be improved.

waste acid containing phosphoric acid to form a mixed waste acid, and then added barium hydroxide to the mixed waste acid. In the step of S300, the waste acid containing phosphoric acid is condensed to a concentration in a range of 50% to 65%. In the step of S310, the condensed waste acid, which the concentration is from 50% to 65%, is mixed with waste aid containing fluoroboric acid to form a mixed waste acid. In the mixed waste acid, the weight ratio of waste acid containing phosphoric acid to waste containing fluoroboric acid is six. In the step of S320, barium hydroxide is added to the mixed waste acid to adjust the pH of the mixed waste acid. Next, the mixed waste acid is held by stirring for one hour so that barium hydroxide can completely react with phosphoric acid and fluoroboric acid in the mixed waste acid which pH is 2.5 to 4.5. In step of S330, a solidifying agent is added in bathes when the mixed waste acid is stirring. In the embodiment, the preferred way for adding the solidifying agent is three times in batches. At first time, a half of total weight of the solidifying agent is added. At the second and the third times, a one-fourth of total weight of the solidifying agent is added, respectively. The solidifying agent is consisted of cement, slag, silicon ash, and fly ash. Temperature of the mixed waste

TABLE 4

Results of solidification and granulation of waste acid containing phosphoric acid mixed with fluoroboric acid

| Conditions | | | | | | Results of solidification | | | |
|---|---|---|---|---|---|---|---|---|---|
| Mixed waste acid | | | | | | | | | |
| Weight of granule after partially granulation (g) | Total weight of phoshoric acid before condensing (g) | Total weight of waste acid containing fluoroboric acid (g) | Applied amount of neutralizer (monohydrous barium hydroxide) (g) | Applied amount of cement (g) | Applied amount of solidifying agent/Mixed waste acid (%) | Compression strength (kg/cm$^2$) | | | Compression strength after dipping 3 months (kg/cm$^2$) |
| | | | | | | After 3 days | After 14 days | After 28 days | |
| 1875 | 1571 | 215 | 210 | — | 30.1 | 25 | | 28 | |
| 1875 | 1393 | 189 | 210 | — | 31.9 | 35 | | 51 | |
| 1657 | 1231 | 167 | 186 | — | 30.1 | 21 | | 29 | |
| Results of dipping the solidified product | | | | | | | | | |
| 5195 | 3750 | 561 | 262.2 | 340 | 34.1 | 67.5 | 78.5 | 74 | 53.5 |
| 4097 | 2810 | 423 | 197 | 318 | 31.6 | 33 | 52 | 64 | 42.5 |
| 4097 | 2810 | 423 | 197 | 283.3 | 31.2 | 33.5 | 48 | 45 | 38.3 |

Figure 3:
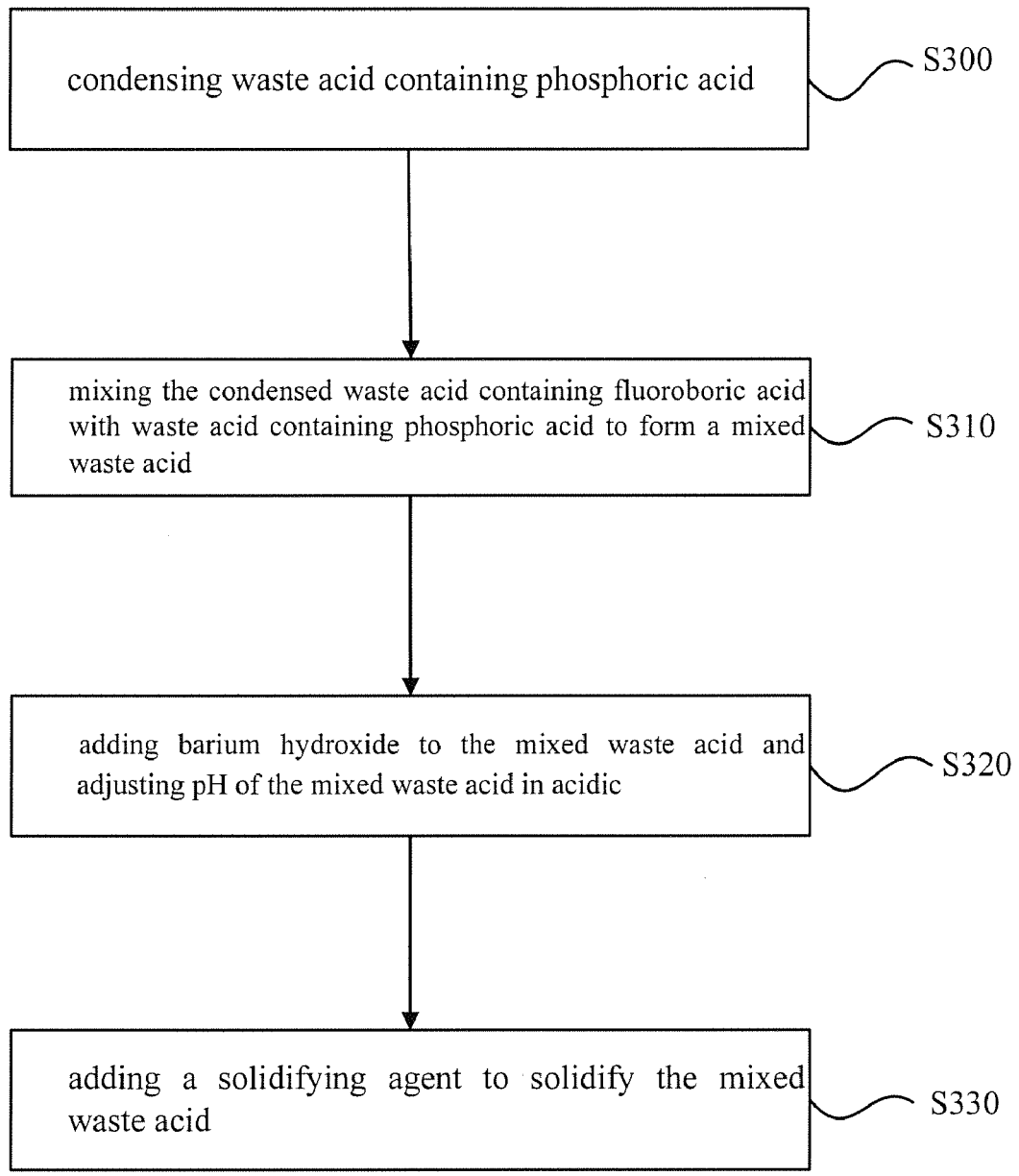
FIG. 3 shows a basic flow diagram of another embodiment of the present invention.

FIG. 3 shows a basic flow diagram of another embodiment of the present invention. In the steps of FIG. 2, barium hydroxide is added to waste acid containing fluoroboric acid, and mixed with waste acid containing phosphoric acid to form a mixed waste acid. In the steps of FIG. 3, the difference is that waste acid containing fluoroboric acid is mixed with acid during the addition of the solidifying agent should be kept in a range of 30 to 45° C.

The following is a detailed description of the embodiment shown in FIG. 3. In the step of S300, 5711 g of waste acid containing phosphoric acid, which indicated as No. B5, is condensed by heating and stirring. The condensed waste acid is 5140 g. In the step of S310, the condensed waste acid is mixed with 860 g of waste acid containing fluoroboric acid to form a mixed waste acid. In the step of S320, 840 g of barium hydroxide is added to the mixed waste acid. The mixed waste acid is held for one hour so that the added barium hydroxide can completely react with the mixed waste acid. Next, in the step of S30, a solidifying agent is added to the mixed waste acid in batches. The solidifying agent, which the total weight is 1560 g, includes 1200 g of cement, 96 g of slag, 172 g of silicon ash, and 504 g of fly ash. The weight ratio of the applied solidifying agent to the mixed waste acid is 23.74%, and the weight ratio of the solidifying agent with a neutralizer to the mixed waste acid is 36.83%. The compression strength of the solidified product formed after 28 days is 27.0 kg/cm$^2$. The compression strength of the solidified product after dipped three months is 60 kg/cm$^2$.

The result of foregoing steps is shown in Table 5. Besides, two results which indicated as Nos. B6 and B7 shown in Table 5 are similar to the result of No. B5. As the results shown in Table 5 indicated, the solidified product of waste acid formed by the method of the invention has improved weather resistance and water resistance characteristics. Moreover, the method of the invention prevents intensely exothermic reaction and rapid setting caused by adding the solidifying agents to influence the efficiency and quality of solidification.

TABLE 5

Results of indirect solidification of waste acid containing phosphoric acid mixed with fluoroboric acid

| | Conditions | | | | | Results | | |
|---|---|---|---|---|---|---|---|---|
| No. | Total weight of waste acid containing phosphoric acid before condensing (g) | Total weight of waste acid containing phosphoric acid after condensed (g) | Total weight of waste acid containing fluoroboric acid (g) | Applied amount of neutralizer (monohydrous barium hydroxide) (g) | Applied amount of solidifying agent (%) | Applied amount of solidifying agent/Total weight of mixed waste acid (%) | Applied amount of solidifying agent + neutralizer/Total weight of mixed waste acid (%) | Compression strength after 28 days (kg/cm$^2$) | Compression strength after dipping 3 months (kg/cm$^2$) |
| B5 | 5711 | 5140 | 860 | 840 | 1560 | 23.74 | 36.83 | 27.0 | 60 |
| B6 | 5711 | 5140 | 860 | 640 | 1560 | 23.74 | 33.48 | 16.0 | 43 |
| B7 | 5711 | 5140 | 860 | 840 | 1705 | 25.95 | 39.73 | 48.5 | 103 |

While the invention is susceptible to various modifications and alternative forms, specific embodiments thereof have been shown by the way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention ad defined by the appended claims.

We claim:

1. A method for treating waste acid containing phosphoric acid and fluoroboric acid comprising the steps of:
   condensing a waste acid containing phosphoric acid;
   adding barium hydroxide to another waste acid containing fluoroboric acid, mixing the waste acid containing fluoroboric acid with the condensed waste acid containing phosphoric acid to form a mixed waste acid, and dividing the mixed waste into two parts;
   dropping one part of the mixed waste acid in a stirrer which contains a first solidifying agent to form at least a granule;
   mixing the formed granule with another part of the mixed waste by stirring; and
   adding a second solidifying agent to the mixed waste by stirring, so that a solidified product of the mixed waste acid can be formed.

2. The method as recited in claim 1, wherein the first solidifying agent is consists of cement, slag, and fly ash.

3. The method as recited in claim 1, wherein the second solidifying agent is consists of cement.

4. The method as recited in claim 1, wherein a weight ratio of the condensed waste acid containing phosphoric acid to the waste acid containing fluoroboric acid is six.

5. A method for treating waste acid containing phosphoric acid and fluoroboric acid Comprising the steps of:
   condensing a waste acid containing phosphoric acid;
   mixing the condensed waste acid containing phosphoric acid with a waste acid containing fluoroboric acid to form a mixed waste acid;
   adding barium hydroxide to the mixed waste acid and adjusting the pH of the mixed waste acid in an acidic pH;
   adding a solidifying agent to the mixed waste acid so that a solidified product can be formed.

6. The method as recited in claim 5, wherein the step of adding the solidifying agent is adding in batches or continuously so that the mixed waste acid can be controlled in a temperature of 30 to 45° C.

7. The method as recited in claim 5, wherein the step of adjusting the pH of the mixed waste acid is adjusting the pH to a range between 2.5 and 4.5.

8. The method as recited in claim 5, wherein the step of condensing the waste acid containing phosphoric acid is condensing to a concentration of at least 50% of phosphoric acid.

* * * * *